Aug. 28, 1956     R. W. RECKHOW     2,760,570
APPARATUS FOR REMOVING SCRAP WIRE FROM SPOOLS
Filed Oct. 10, 1952     2 Sheets-Sheet 1
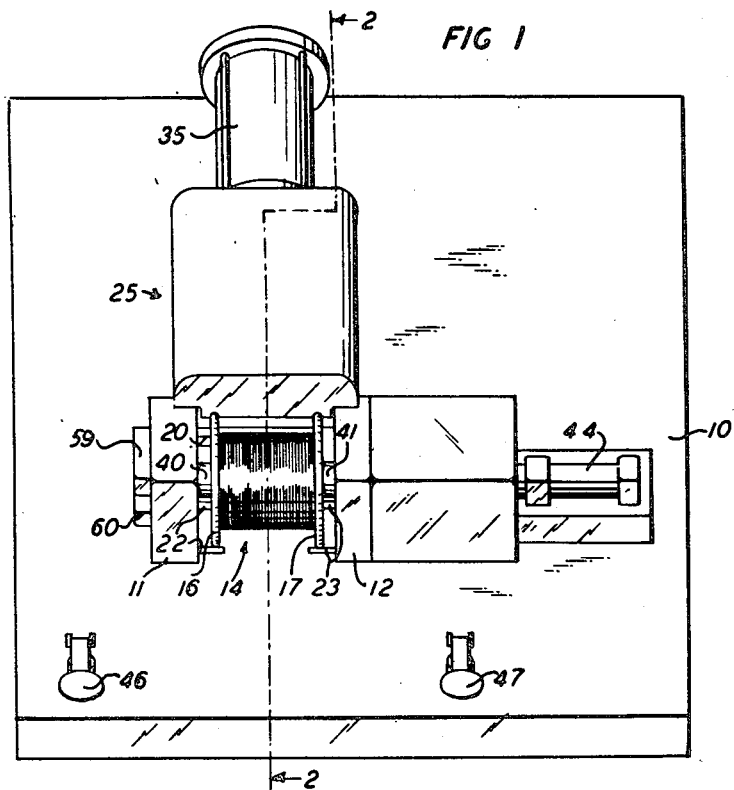
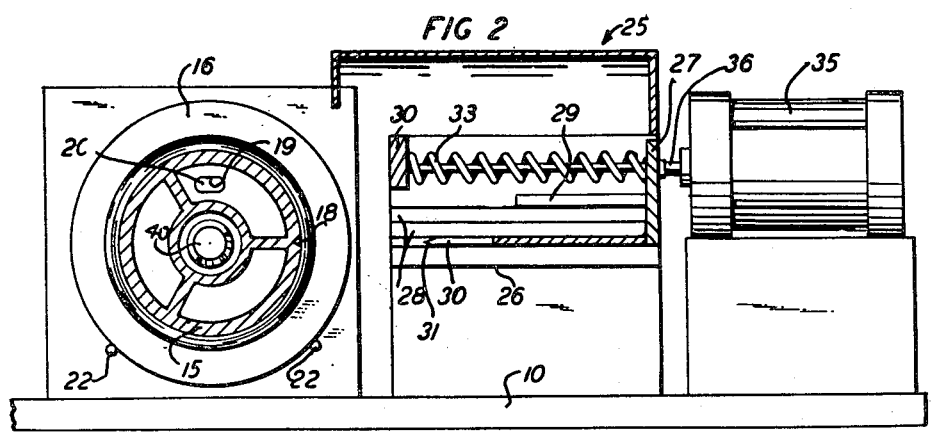
INVENTOR
R. W. RECKHOW
BY
ATTORNEY Aug. 28, 1956 R. W. RECKHOW 2,760,570
APPARATUS FOR REMOVING SCRAP WIRE FROM SPOOLS
Filed Oct. 10, 1952. 2 Sheets-Sheet 2
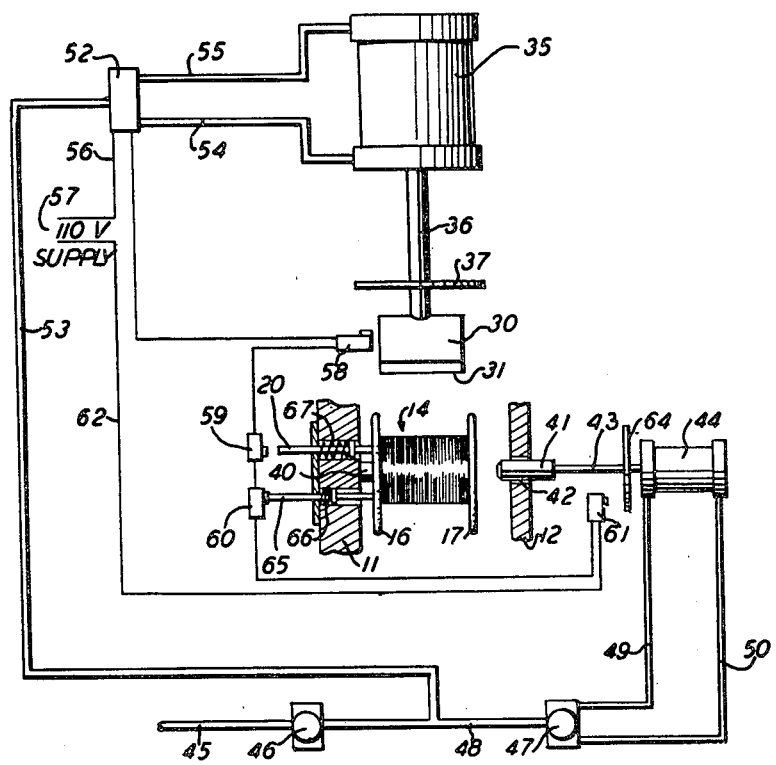
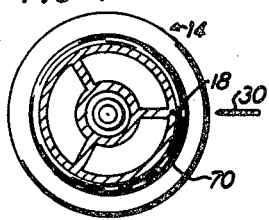
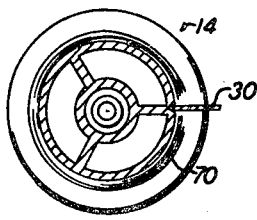
INVENTOR
R. W. RECKHOW
BY
*W.C. Parnell*
ATTORNEY

United States Patent Office 2,760,570
Patented Aug. 28, 1956

2,760,570

APPARATUS FOR REMOVING SCRAP WIRE FROM SPOOLS

Robert W. Reckhow, Kenmore, N. Y., assignor to Western Electric Company, Incorporated, New York, N. Y., a corporation of New York Application October 10, 1952, Serial No. 314,070

1 Claim. (Cl. 164—47)

This invention relates to apparatus for cutting strands from spools or the like, and more particularly to apparatus for cutting all convolutions of strands on spools.

In the processing of certain types of strands, such as electrical conductors for use in the telephone industry, frequently there are spools or reels containing defective wire or remnants of insufficient length for further processing. The removal of such wire by unwinding it from the reels is usually uneconomical and it is common practice to cut the strands. Apparatus used for this purpose, however, should sever every strand without damaging the spool since even slight burrs left on the spool will produce other defects in the wire when the spool is used again.

The object of the present invention is an apparatus which is simple in structure, highly efficient in operation and extremely accurate in the cutting of all convolutions of a strand from a spool.

With this and other objects in view, the invention comprises an apparatus for cutting strands from spools or the like wherein means is provided to support a spool, having convolutions of strand material thereon, with its center line lying in a given plane while a cutter, movable in the plane, is actuable to sever the convolutions on the spool.

More specifically, the apparatus includes a control mechanism linked with the mounting of the spool so that the cutter is held inoperative until the spool is mounted in place and a groove therein, which is to receive the leading end of the cutter, is positioned in a plane with the cutter.

Other objects and advantages will be apparent from the following detailed description when considered in conjunction with the accompanying drawings, wherein:

Fig. 1 is an isometric view of the apparatus with a reel mounted therein;

Fig. 2 is a vertical sectional view of the apparatus taken along the line 2—2 of Fig. 1;

Fig. 3 is a schematic illustration of the electro-pneumatic controls for the apparatus;

Fig. 4 is a vertical sectional view of a reel positioned relative to the cutter prior to the cutting stroke, and Fig. 5 is a vertical sectional view of the reel and cutter at the completion of the cutting stroke.

Referring now to the drawings, attention is first directed to Figs. 1 and 2 which illustrate a suitable support or base 10 upon which vertical members 11 and 12 are mounted at spaced positions depending upon the size of the spool or reel 14.

In the present embodiment of the invention, the apparatus is designed for a particular type of spool or reel having a hub or central portion 15 disposed between heads 16 and 17, the central portion having a V-shaped groove 18 extending the full length of the central portion to the heads 16 and 17. The head 16 has an elongate aperture 19 therein to receive a locating pin 20 of a similar cross-sectional contour.

The vertical members 11 and 12 have inwardly extending aligned pairs of pins 22 and 23 to support the heads 16 and 17 of the spools.

A cutting unit indicated generally at 25 includes a frame-like structure 26 to support a carriage 27 between laterally spaced guides 28. The carriage includes a guide portion 29 and a parallel cutter 30 having a knife-like leading edge 31 disposed in a plane with the V-shaped groove 18 of the spool. The carriage 27 is normally urged to the right (Fig. 2) by one or more springs 33 disposed between the carriage 27 and a laterally extending member 34 of the frame 26. The carriage 27 is provided with an air cylinder 35 having the conventional piston with a piston rod 36 connected to the carriage.

Attention is now directed to Fig. 3 which illustrates the electro-pneumatic controls for the apparatus. The reel or spool 14, when disposed on the supporting pins 22 and 23, has its hubs positioned in axial alignment with a stationary supporting element 40 and a movable supporting element 41. The stationary element 40 is mounted on the vertical member 11 while the movable element 41 is movable through an aperture or suitable bushing 42 in the member 12 and connected to a piston rod 43 of an air cylinder 44. The air cylinder 44 is connected to a main air supply 45 through manually operable valves 46 and 47. The valve 47 is of the three-way type, providing normally open communication between line 48, extending from valve 46, through line 49 to one end of the air cylinder 44 to normally hold the support 41 away from the spool (as shown in Fig. 3). When the valve 47 is actuated with valve 46, line 50 is open to the supply using the line 49, as an exhaust line for the air cylinder.

The air cylinder 35 is under the control of a solenoid operable valve 52, connected to air line 48 through line 53, and connected to the ends of the air cylinder 35, respectively, through lines 54 and 55. The valve 52 is positioned to provide open communication between lines 53 and 54 to return the carriage 37 and cutter 30 to the starting position and hold them in this position.

The solenoid valve 52 is connected to one line 56 of a 110 v. supply 57 and depends on a series of microswitches 58, 59, 60 and 61 for the completion of the circuit through the other line 62 of the supply 57. Microswitches 58 and 59 are normally closed while microswitches 60 and 61 are normally open. It is necessary, therefore, that a member 64 movable with the supporting element 41 on the piston rod 43 engage and operate the switch 61 into closed position after the element 41 has entered the hub of the reel to hold the reel against movement. A spring pressed pin 65 normally urged to the right by its spring 66 is of a given length sufficient to be engaged by the head 16 of the spool and be moved to the left to engage and close the microswitch 60 when the spool is in position. The pin 20 parallel with the pin 65 is normally urged to the right to enter the aperture 19 to allow the switch 59 to remain normally closed, but if the pin should not be permitted to enter the aperture and will engage the head 16, the switch 59 will be opened, holding the circuit to the solenoid valve 52 open.

Considering now the operation of the apparatus, let it be assumed that the numerous spools or reels 14 having convolutions of strand material or wire 70 thereon, are to be positioned singly in the apparatus. The apparatus is shown schematically in the open position in Fig. 3. While in this position, a reel may be moved onto the pins 22 and 23, and it is recommended that during this procedure, the spool or reel be kept to the right as much as possible to free the ends of the pins 20 and 65. When the reel is disposed on the supporting pins 22 and 23, it may be turned about its axis until the aperture 19 is in alignment with the pin 20. This may be readily observed due to the fact that the pin 20 is disposed above the fixed supporting element 40.

At this time, the operator may actuate the valves 46 and 47 holding them in operated position. The first thing which takes place after operation of the valves 46 and 47 is actuation of the movable supporting element 41 to engage the adjacent hub of the spool in the head 17 and moving the spool laterally until it engages the fixed position supporting element 40 and moves the rod or pin 65 against its spring 66 to close the switch 60. If the pin 20 is in alignment with the aperture 19, the adjacent end of the pin will enter the aperture (as shown in Figure 3) and serve to lock the reel against rotation. With the pin 20 entering the aperture 19, the operator is assured that the groove 18 is in a plane with the cutter 30 and in this manner, all of the switches 58 to 61 inclusive, are closed, completing the circuit through the solenoid valve 52 to cause the piston in the air cylinder 35 to force the cutter toward the axis of the reel until the leading edge 31 enters the groove 18 to complete cutting all convolutions of the strand material or wire 70. The microswitch 58, in the present instance, is positioned to be engaged by the carriage 37 and opened upon the completion of the cutting stroke to open the circuit to the solenoid valve allowing it to return to its normal position. In this manner, the cutter will return to its normal position after which the operator may release the valves 46 and 47 to free the supporting element 41 from the spool so that the spool may be removed from the apparatus. This is made possible by movement to the right of the spool to free the pin 20 from the aperture 19.

If during location of any reel in the apparatus, the operator fails to align the aperture 19 with the pin 20, closing of the valves 46 and 47 to actuate the supporting element 41 will cause the pin 20 to engage and open the normally closed switch 59 holding the circuit to the solenoid valve 52 open. It is, therefore, apparent that the microswitches and the valves provide a linkage whereby the spool or reel in each instance must be positioned accurately with respect to the plane of the cutter before the cutter may be operated and accidental operation of the valves 46 and 47 without the presence of a reel in the apparatus, would render the cutter inoperable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus, for cutting convolutions of strand material from a spool having a recess in one of its heads and a cutter receiving groove extending the full length of the strand supporting portion of the spool and also extending radially inwardly from the outer periphery of said portion, comprising means to rockably support the spool about its center, a cutter having an edge substantially equal in length to the groove and supported for movement in a plane with the center of the supported spool, means operable to move the cutter to move the edge thereof to a position closer to the spool center than the outer periphery of the strand supporting portion thereof, and an element supported for longitudinal movement at a fixed position, receivable in the recess only when the groove is disposed in the plane to receive the edge of the cutter and effective when not in the recess to disable the cutter moving means.

References Cited in the file of this patent

UNITED STATES PATENTS

| | | |
|---|---|---|
| 772,113 | Osswald | Oct. 11, 1904 |
| 2,326,536 | Hartsock et al. | Aug. 10, 1943 |
| 2,346,719 | Aske | Apr. 18, 1944 |
| 2,427,418 | Rast | Sept. 16, 1947 |
| 2,589,849 | Oetiker | Mar. 18, 1952 |
| 2,609,876 | Bauer et al. | Sept. 9, 1952 |